United States Patent
Struhl et al.

(10) Patent No.: US 11,098,739 B2
(45) Date of Patent: Aug. 24, 2021

(54) BUSHING ASSEMBLY FOR TUBULAR STRUCTURES AND A SYSTEM FOR MOUNTING A TUBULAR STRUCTURE TO A MOUNTING STRUCTURE INCORPORATING THE SAME

(71) Applicants: Clifford Struhl, Syosset, NY (US); Raymond M. Schneider, Port Washington, NY (US)

(72) Inventors: Clifford Struhl, Syosset, NY (US); Raymond M. Schneider, Port Washington, NY (US)

(73) Assignee: Clifford Struhl, Syosset, NY (US)

( * ) Notice: Subject to any disclaimer, the term of this patent is extended or adjusted under 35 U.S.C. 154(b) by 300 days.

(21) Appl. No.: 16/296,464

(22) Filed: Mar. 8, 2019

(65) Prior Publication Data
US 2019/0338794 A1    Nov. 7, 2019

Related U.S. Application Data

(60) Provisional application No. 62/666,999, filed on May 4, 2018.

(51) Int. Cl.
  *F16B 19/00*    (2006.01)
  *F16B 9/00*    (2006.01)

(52) U.S. Cl.
  CPC ............... *F16B 9/056* (2018.08); *F16B 9/07* (2018.08)

(58) Field of Classification Search
  CPC .................................. F16B 9/056; F16B 9/07
  USPC ................. 411/148, 180, 188, 508, 509, 510
  See application file for complete search history.

(56) References Cited

U.S. PATENT DOCUMENTS

| | | | | |
|---|---|---|---|---|
| 3,320,846 A | * | 5/1967 | Orain | F16C 35/067 411/521 |
| 3,633,862 A | * | 1/1972 | Breen | F16B 7/18 248/251 |
| 3,864,051 A | * | 2/1975 | Reid | F16B 7/0446 403/408.1 |
| 4,518,293 A | * | 5/1985 | Pleickhardt | F16B 37/02 411/107 |
| 4,691,889 A | * | 9/1987 | Richards | F16B 7/18 248/343 |
| 4,810,144 A | * | 3/1989 | Martelli | F16B 37/122 411/182 |
| 5,230,581 A | * | 7/1993 | Deng | F16B 7/18 403/260 |
| 5,310,298 A | * | 5/1994 | Hwang | F16B 7/18 411/182 |
| 5,503,492 A | * | 4/1996 | Stevens | F16B 7/0413 16/42 T |
| 6,227,785 B1 | * | 5/2001 | Kilgore | F16B 2/241 411/437 |
| 6,679,666 B2 | * | 1/2004 | Mizuno | F16B 43/001 411/353 |

(Continued)

*Primary Examiner* — Gary W Estremsky
(74) *Attorney, Agent, or Firm* — Dilworth & Barrese, LLP.; Michael J. Musella, Esq.

(57) ABSTRACT

A bushing assembly for tubular structures is disclosed. The bushing assembly includes a body having a substantially flat configuration and defining a planar surface and an outer edge; and a plurality of projections extending from the outer edge and traverse to the planar surface, each projection defining a longitudinal axis, each projection including at least one ridge extending at least partially along a surface of the projection and along the longitudinal axis.

20 Claims, 11 Drawing Sheets

(56) References Cited

U.S. PATENT DOCUMENTS 7,114,899 B2 * 10/2006 Gass ................. F16B 9/056
                                                            411/107
8,621,710 B2 * 1/2014 Carpinella ............ A47B 91/06
                                                            16/42 T

* cited by examiner

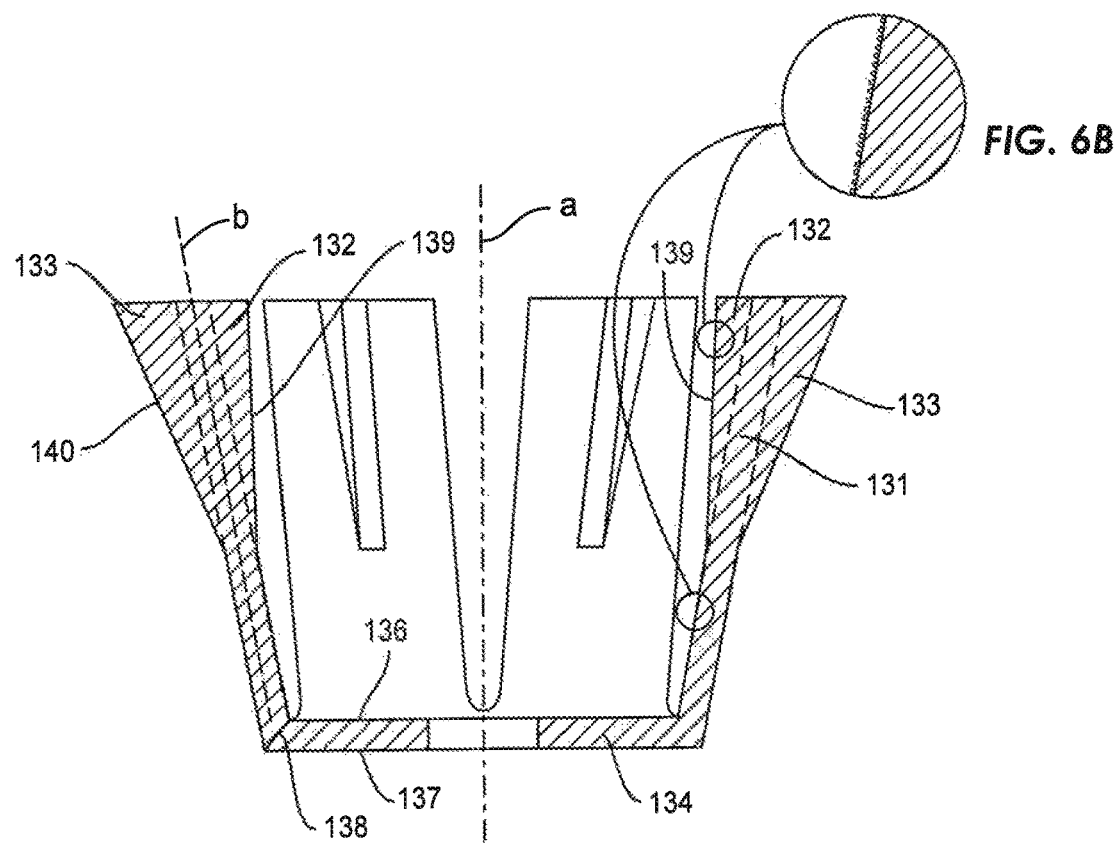
FIG. 6A
FIG. 6B
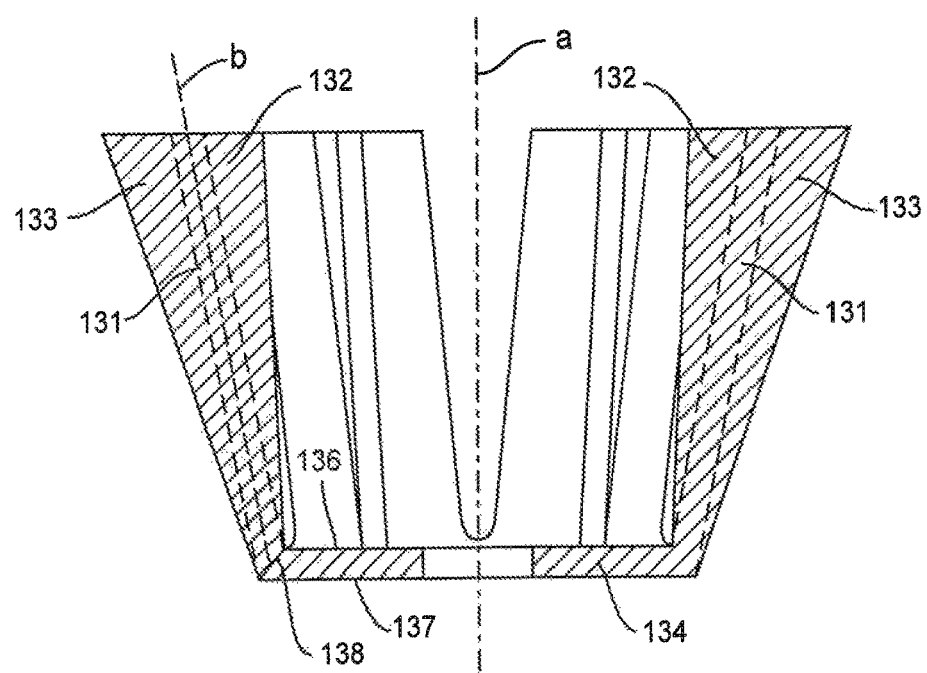
FIG. 7

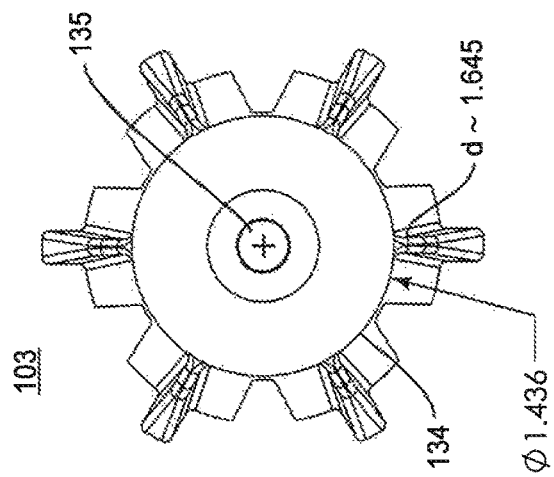
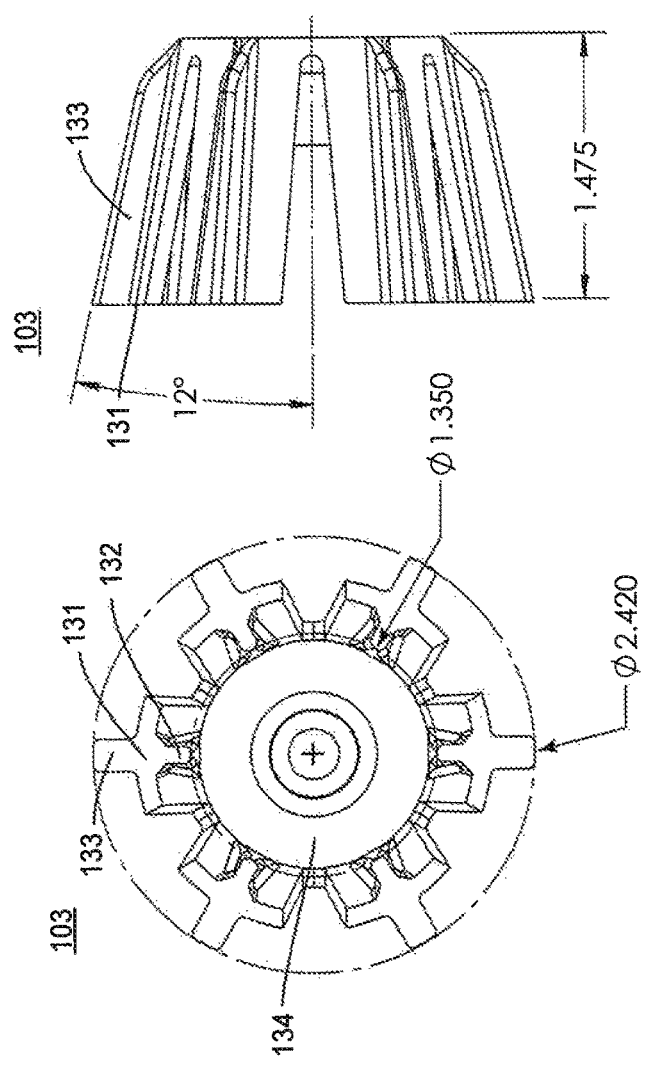
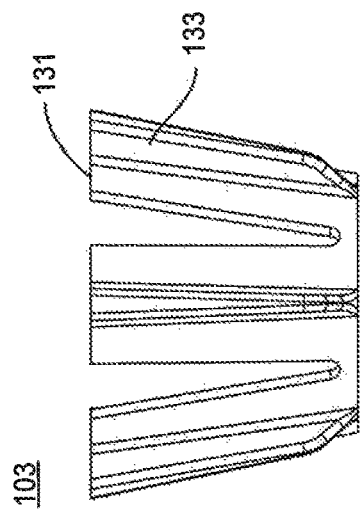
FIG. 12A
FIG. 12B
FIG. 12C
FIG. 12D

BUSHING ASSEMBLY FOR TUBULAR STRUCTURES AND A SYSTEM FOR MOUNTING A TUBULAR STRUCTURE TO A MOUNTING STRUCTURE INCORPORATING THE SAME

CROSS REFERENCE TO RELATED APPLICATIONS

This application claims the benefit of U.S. Provisional Application No. 62/666,999, filed May 4, 2018, the entire contents of which are incorporated herein by reference.

TECHNICAL FIELD

The present disclosure relates generally to a bushing assembly and components thereof, and more particularly, to a bushing assembly having a ribbed compression bushing and a system for mounting a tubular structure to a mounting structure.

BACKGROUND OF THE INVENTION

Forming a secure connection between a pole or other tubular element and a mounting structure is required for many applications. For example, the legs of a stand are typically held together by horizontal tubular elements. Prior art systems utilized a multitude of systems to connect the tubular elements to the legs. Most of these systems resulted in unsecure and wobbly assembled stands.

Accordingly, it is desirable to provide an improved bushing assembly that overcomes deficiencies in the prior art.

SUMMARY OF THE INVENTION

Generally speaking, in accordance with the invention, an improved bushing assembly is provided.

In one embodiment of the invention, a bushing assembly includes a bushing assembly for tubular structures, wherein the bushing assembly comprises a body having an inner body surface, an outer body surface and a body edge. The inner body surface defines a substantially planar surface and an outer edge having a circumference. The outer body surface defines another substantially planar surface and another outer edge having another circumference. The two substantially planar surfaces are substantially parallel to each other and have similarly curved shapes such as circle, oval, ellipse, and etc. The body edge is attached to the circumference of the outer edge of the inner body surface and the circumference of the outer edge of the outer body surface. The bushing assembly also comprises a plurality of projections extending outward from the body edge and traverse to the planar surface defined by the outer body surface, and each projection defines a longitudinal axis.

Each projection has an inner surface wherein the inner surface has either a smooth surface or surface features. Examples of the surface features include a plurality of elevated small areas, a coating of a thin layer of rough materials, and a physical or chemical treatment to coarse the inner surface of the projection. The smooth inner surface may be utilized, for example, when the tubular structure has a rough surface. The surface features on the inner surface may be used to improve the friction between the projections and the tubular structure and to provide further ability of securely holding the tubular structure.

The inner surface may further comprise an inner ridge extending at least partially along the inner surface of the projection and along the longitudinal axis. The top of the inner ridge has either a smooth surface or surface features similar to that of the inner surface, depending on whether additional friction between the inner ridge and the tubular structure is desired.

Each projection has an outer surface wherein the outer surface has either a smooth surface or surface features similar to that of the inner surface. The smooth outer surface may be utilized, for example, when the mounting structure has a rough surface. The surface features on the outer surface may be used to improve the friction between the projections and the mounting structure and to provide further ability of securely holding the bushing.

The outer surface may further comprise an outer ridge extending at least partially along the outer surface of the projection and along the longitudinal axis. The top of the outer ridge has either a smooth surface or surface features similar to that of the outer surface.

The bushing assembly, wherein each projection has an inner surface and an outer surface and further comprises an inner ridge extending at least partially along the inner surface of the projection and along each longitudinal axis and an outer ridge extending at least partially along the outer surface of the projection and along the longitudinal axis.

The bushing assembly, wherein the body is sized and shaped to receive an end of a similarly sized and shaped tubular structure.

The bushing assembly, wherein the body defines a hole therethrough positioned substantially in the center of the body.

The bushing assembly having an uncompressed state wherein the distal ends of the projections are at a first distance from each other and a compressed state wherein the distal ends of the projections are at a second distance from each other, the first distance being greater than the second distance.

The bushing assembly, wherein each projection extends outward from the body edge at an angle between 1 degree and 20 degrees to the central axis.

In another embodiment of the invention, a system for mounting a tubular structure to a mounting structure, comprising: a bushing assembly, comprising: a body having an inner body surface, an outer body surface, a body edge and a hole; wherein the inner body surface defines a substantially planar surface and an outer edge having a circumference, the outer body surface defines another substantially planar surface and another outer edge having another circumference, the two substantially planar surfaces are substantially parallel to each other, the body edge is attached to the circumference of the outer edge of the inner body surface and the circumference of the outer edge of the outer body surface, and the hole is positioned substantially in the center of the body; and a plurality of projections extending outward from the body edge and traverse to the planar surface defined by the outer body surface, each projection having an unattached distal end and defining a longitudinal axis, the unattached distal ends defining a circumference greater than the circumference of the outer edge of the inner body surface, wherein the body and the projections define an inner cavity of the bushing, and wherein the plurality of projections defines an outer surface of the bushing; the tubular structure mateable within the inner cavity of the bushing assembly and having a cross-sectional circumference, comprising: a connector connectable to the tubular structure, wherein the circumference of the inner body surface of the bushing is substantially equal to the circumference of the tubular structure; the mounting structure defining a recess mateable with the outer surface of the bushing and having an inner conical shape and an inner surface positioned at a base of the recess, the mounting structure defining a hole therethrough positioned substantially in the center of the inner surface of the recess; and a mating connector through the hole of the mounting structure and the hole of the bushing assembly, and mateable with the connector of the tubular structure.

The system, wherein each projection includes a ridge on both the inner and outer surfaces of the projection and along the longitudinal axis.

The system, wherein the bushing assembly has an uncompressed state wherein the plurality of projections is at a first distance from each other and a compressed state wherein the plurality of projections is at a second distance from each other, the first distance being greater than the second distance.

The system, wherein in the final assembled and compressed state, the bushing assembly compresses onto the tubular structure to hold it securely inside the mounting structure and form a more ridged structure than a system without the claimed bushing assembly.

Other embodiments of the invention will be apparent from the drawings and the specification to follow and the scope of the invention will be indicated in the claims.

BRIEF DESCRIPTION OF THE DRAWINGS

The present disclosure will become more readily apparent from the specific description accompanied by the following drawings, in which:

FIG. 6A is a cross-sectional view of one embodiment of a bushing assembly in accordance with aspects of the present disclosure; and FIG. 6B is an enlarged view of the surface features in accordance with aspects of the present disclosure;

FIG. 7 is a cross-sectional view of another embodiment of a bushing assembly in accordance with aspects of the present disclosure;

FIGS. 12A, 12B, 12C and 12D provide specific dimensions of a preferred embodiment of a bushing assembly in accordance with aspects of the present disclosure; FIG. 12A is a top view of a preferred embodiment of a bushing assembly in accordance with aspects of the present disclosure; FIG. 12B is a side view of a preferred embodiment of a bushing assembly in accordance with aspects of the present disclosure; FIG. 12C is a bottom view of a preferred embodiment of a bushing assembly in accordance with aspects of the present disclosure; and FIG. 12D is a front view of a preferred embodiment of a bushing assembly in accordance with aspects of the present disclosure;

Throughout the disclosure, like reference numerals will be used to indicate similar elements.

DETAILED DESCRIPTION

The present disclosure may be understood more readily by reference to the following detailed description, taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments, by way of example only, and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. In particular, they are intended to refer to the spatial reference of the display stand in its normal, assembled configuration during intended use.

The bushing assembly for tubular structures and system for mounting a tubular structure to a mounting structure according to the present disclosure will now be described with respect to the drawings.

Figure 1:
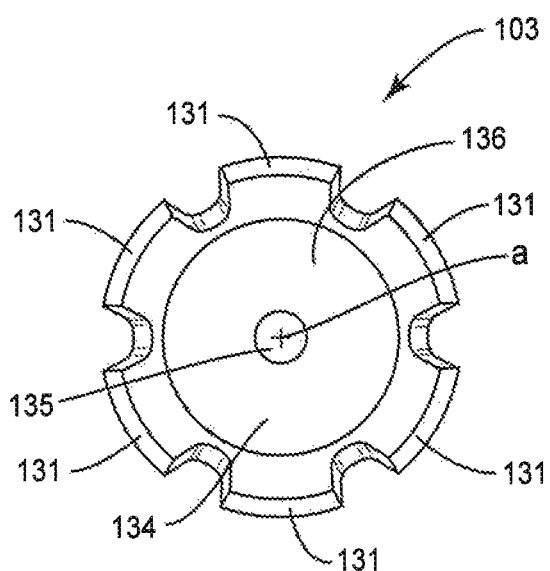
FIG. 1 is a view of the inner cavity of the bushing in the direction of a longitudinal axis of the bushing.
Figure 2:
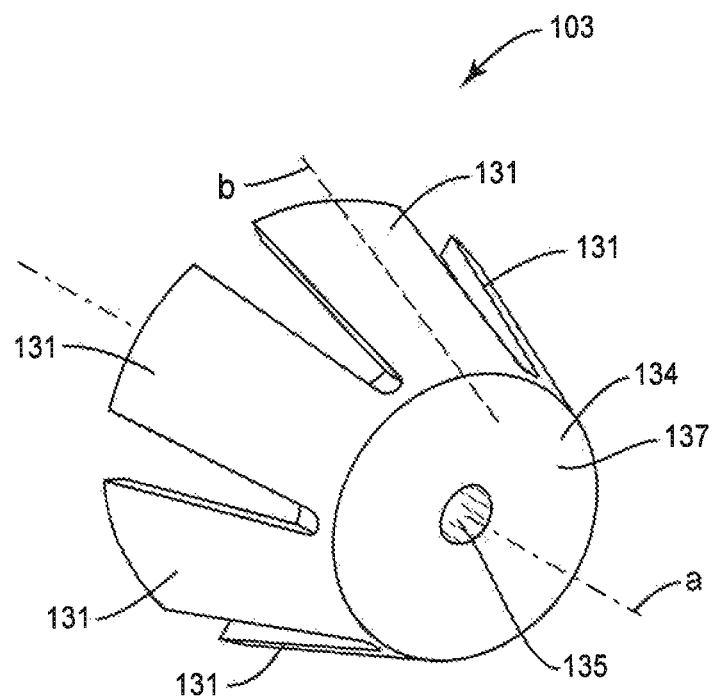
FIG. 2 is a view of the outside of the bushing in the direction of an acute angle to the longitudinal axis of the bushing.

FIG. 1 and FIG. 2 together illustrate a first embodiment of a bushing assembly in accordance with aspects of the present disclosure. FIG. 1 is a view of the inner cavity of the bushing in the direction of an imaginary central axis of the bushing. FIG. 2 is a view of the outside of the bushing in the direction of an acute angle to the imaginary central axis of the bushing. In particular, referring to FIGS. 1 and 2, the bushing 103 includes a body 134 and a plurality of projections 131. The body 134 and the plurality of projections 131 define an inner cavity of the bushing. The body 134 has an inner body surface 136 (see FIG. 1), an outer body surface 137 (see FIG. 2) and a body edge (see discussion of 138 in connection to FIGS. 6 and 7). The inner body surface 136 and the outer body surface 137 each defines a substantially planar surface and the two surfaces are substantially parallel to each other and have similarly curved shapes such as circle, oval, ellipse, and etc. The inner body surface 136 and the outer body surface 137 each defines an outer edge having a circumference. The circumference of the outer edge of the inner body surface is in the range of from 3.1" to 6.3", preferably from 3.5" to 4.7", and more preferably from 3.8" to 4.1". The circumference of the outer edge of the outer body surface is in the range of from 3.1" to 6.3", preferably from 3.9" to 5.5", and more preferably from 4.4" to 4.7". The body edge is attached to the circumference of the outer edge of the inner body surface and the circumference of the outer edge of the outer body surface.

An imaginary central axis "a" is defined as substantially at the center of the inner body surface 136 and the outer body surface 137. The central axis "a" is substantially perpendicular to the inner body surface 136 and the outer body surface 137. A hole 135 having a circumference is located substantially at the center of the body 134. The circumference of the hole 135 substantially circles around the central axis "a".

The projections 131 are attached to the body edge. The projections 131 extend in a direction traverses to the planar surface defined by the outer body surface 137. Each projection 131 defines a longitudinal axis "b" and the longitudinal axis "b" angles out from the central axis "a". Along the longitudinal axis "b", the projections 131 extend outward from ends attached to the body 134 to unattached distal ends at an angle of from 1 degree to 20 degrees, preferably from 10 degrees to 15 degrees, and more preferably from 11 degrees to 12 degrees.

The bushing can be fabricated from materials suitable for outdoor environments, including, but not limited to, metal(s), rubber(s), plastic(s), wood(s), alloy(s), combinations thereof, etc. Various components of the bushing may be fabricated from material composites, including the above materials, to achieve various desired characteristics such as strength, rigidity, elasticity, flexibility, compliance, performance, and durability. The components of the bushing, individually or collectively, may also be fabricated from a heterogeneous material such as a combination of two or more of the above-described materials.

Each projection has an inner surface wherein the inner surface has either a smooth surface or surface features. Examples of the surface features include a plurality of elevated small areas, a coating of a thin layer of rough materials, and a physical or chemical treatment to coarse the inner surface of the projections. The materials of the surface features may be same or different from the materials of the inner surfaces. For example, the inner surface may be physically treated to increase the roughness (i.e., the same material is used for both the surface feature and the inner surface), or a coating of rubber may be applied to an inner surface made of an alloy (i.e., different materials are used for the surface feature and the inner surface). The smooth inner surface may be utilized, for example, when the tubular structure has a rough surface. The surface features on the inner surface may be used to improve the friction between the projections and the tubular structure and to provide further ability of securely holding the tubular structure.

Each projection has an outer surface wherein the outer surface has either a smooth surface or surface features. Examples of the surface features include a plurality of elevated small areas, a coating of a thin layer of rough materials, and a physical or chemical treatment to coarse the outer surface of the projections. The materials of the surface features may be same or different from the materials of the outer surfaces. For example, the outer surface may be physically treated to increase the roughness (i.e., the same material is used for both the surface feature and the outer surface), or a coating of rubber may be applied to an outer surface made of an alloy (i.e., different materials are used for the surface feature and the outer surface). The smooth outer surface may be utilized, for example, when the mounting structure has a rough surface. The surface features on the outer surface may be used to improve the friction between the projections and the mounting structure and to provide further ability of securely holding the bushing.

Figure 3:
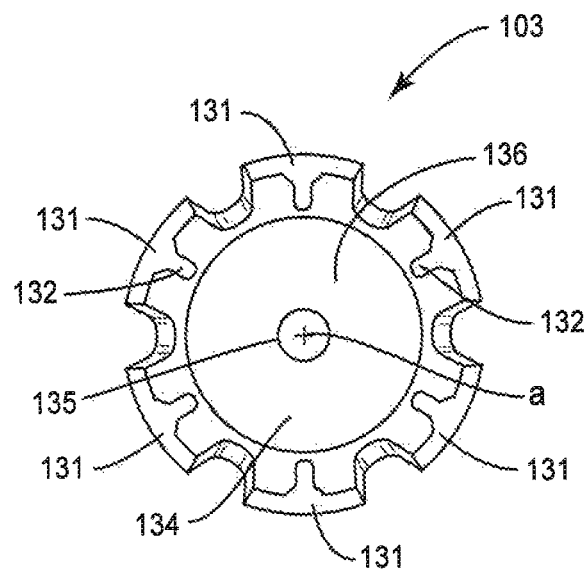
FIG. 3 illustrates a second embodiment of a bushing assembly in accordance with aspects of the present disclosure.

FIG. 3 illustrates a second embodiment of a bushing assembly in accordance with aspects of the present disclosure. Each projection 131 has an inner surface, and includes at least one of an inner ridge 132. The inner ridge 132 extends at least partially along the inner surface of the projection 131 and along the longitudinal axis "b" of the bushing.

Figure 4:
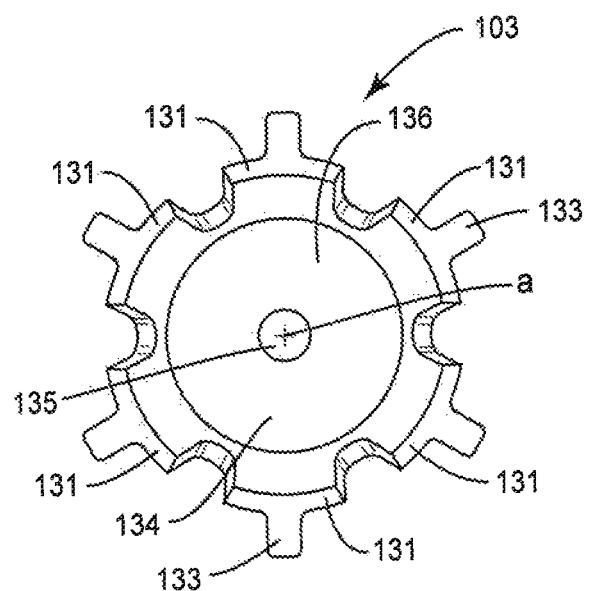
FIG. 4 illustrates a third embodiment of a bushing assembly in accordance with aspects of the present disclosure.

FIG. 4 illustrates a third embodiment of a bushing assembly in accordance with aspects of the present disclosure. Each projection 131 has an outer surface, and includes at least one of an outer ridge 133. The outer ridge 133 extends at least partially along the outer surface of the projection 131 and along the longitudinal axis "b" of the bushing.

Figure 5:
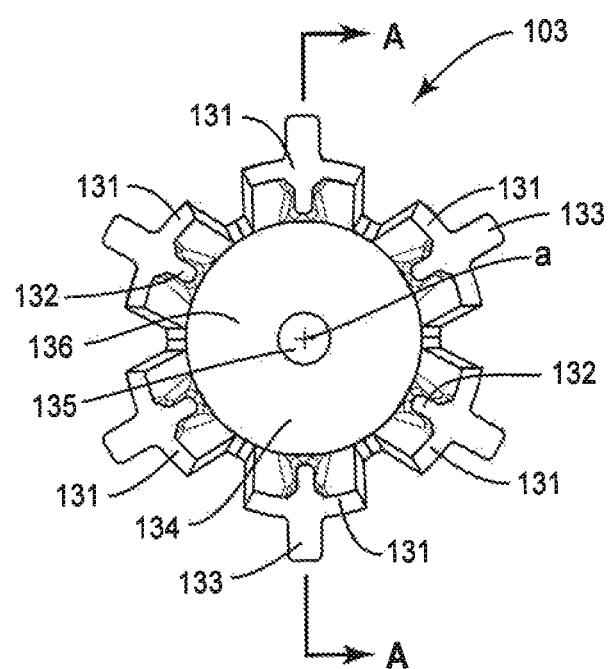
FIG. 5 illustrates a fourth embodiment of a bushing assembly in accordance with aspects of the present disclosure.

FIG. 5 illustrates a fourth embodiment of a bushing assembly in accordance with aspects of the present disclosure. Each projection 131 has an inner surface and an outer surface. Each projection 131 includes at least one of an inner ridge 132 and at least one of an outer ridge 133. The inner ridge 132 extends at least partially along the inner surface of the projection 131 and along the longitudinal axis "b" of the bushing. The outer ridge 133 extends at least partially along the outer surface of the projection 131 and along the longitudinal axis "b" of the bushing. A cross-sectional view along the cutting plane "A" of the bushing assembly is illustrated in FIGS. 6 and 7.

FIG. 6 is a cross-sectional view of one embodiment of the bushing assembly along the cutting plane "A" showing in FIG. 5. The body edge 138 is attached to the circumference of the outer edge of the inner body surface 136 and the circumference of the outer edge of the outer body surface 137. The projections 131 are attached to the body edge 138. The inner ridges 132 extend partially along the inner surface of the projection 131 and along the longitudinal axis "b". In one embodiment, the inner ridge 132 extends further out from the projection 131 at the distal end and less at the proximal end attached to the inner surface of the projection 131. The outer ridges 133 extend partially along the outer surface of the projection 131 and along the longitudinal axis "b". In one embodiment, the outer ridge 133 extends further out from the projection 131 at the distal end and less at the proximal end attached to the outer surface of the projection 131. When in the uncompressed configuration, the ridge top 139 of the inner ridge 132 is substantially perpendicular to the inner body surface 136.

The inner surface of the projection, or the ridge top 139 of the inner ridge 132, or both may comprise surface features for improving the friction between the tubular structure and the inner ridge and/or the inner surface. Examples of the surface features include a plurality of elevated small areas, a coating of a thin layer of rough materials, and a physical or chemical treatment to coarse the inner ridge and/or the inner surface of the projection. An example of such surface feature, i.e., a plurality of elevated small areas, either on the inner surface or the ridge top 139, is showing in FIG. 6B in an enlarged view.

The outer surface of the projection, or the ridge top 140 of the outer ridge 133, or both may comprise surface features for improving the friction between the mounting structure and the outer ridge and/or the outer surface. Examples of the surface features include a plurality of elevated small areas, a coating of a thin layer of rough materials, and a physical or chemical treatment to coarse the inner ridge and/or the inner surface of the projection.

A plurality of the ridge tops 139 form a substantially right-angled cylinder for receiving a similarly sized and shaped tubular structure. For example, if the tubular structure has a circular cross section having a diameter, then the plurality of the ridge tops 139 form a substantially right-angled circular cylinder, and the inner body surface 136 is in circular shape having a diameter. The diameter of the cylinder formed from the ridge tops 139 is slightly larger than the diameter of the tubular structure. The diameter of the tubular structure is substantially the same as, or slightly smaller than, the diameter of the inner body surface 136. A plurality of the ridge tops 140 form an inverted and substantially conical frustum shape.

FIG. 7 is a cross-sectional view of another embodiment of the bushing assembly along the cutting plane "A" showing in FIG. 5. The projections 131 are attached to the body edge 138. The inner ridges 132 extend from the outer edge of the inner body surface 136, along the inner surface of the projection 131 and along the longitudinal axis "b". The outer ridges 133 extend from the outer edge of the outer body surface 137, along the outer surface of the projection 131 and along the longitudinal axis "b". The ridge top 139 of the inner ridge 132 is substantially parallel to the imaginary central axis "a".

Figure 8:
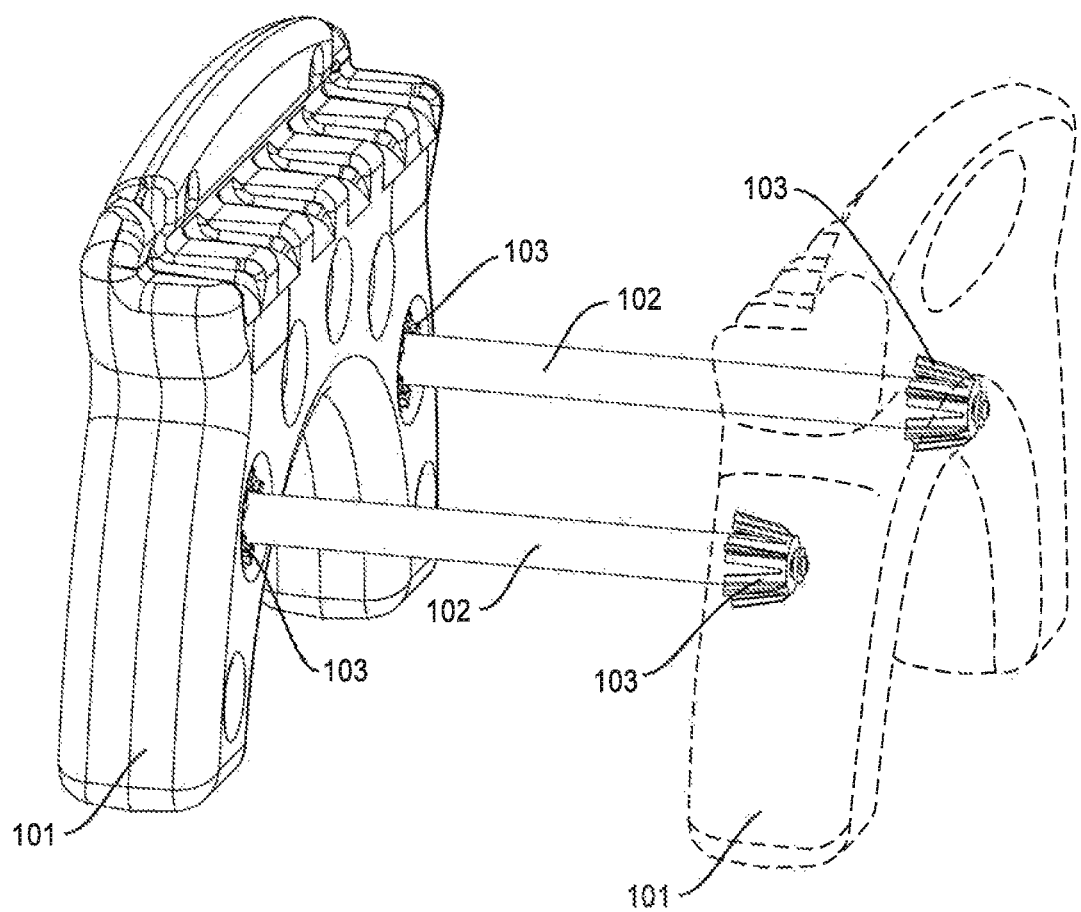
FIG. 8 illustrates a stand utilizing a bushing assembly in accordance with aspects of the present disclosure.

A typical application of the system for mounting a tubular structure to a mounting structure is shown in FIG. 8, which illustrates a stand. Although the present disclosure describes the system for mounting a tubular structure to a mounting structure and bushing assembly with reference to a stand, other applications are contemplated. For example, the present invention can be applied to connecting rungs of a ladder to the uprights or connecting rungs of a chair to its legs. In addition, a single ended support can be implemented for use in supporting a pole at one end in a vertical or horizontal position or angles therebetween.

The system shown in FIG. 8 includes two mounting structures 101 (e.g., legs), two tubular structures 102, and four bushings 103. Further details of the system are demonstrated in FIGS. 9-11. As described above, the number, shapes and sizes of the mounting structures, tubular structures, and/or bushings can be modified for particular implementations.

Figure 9:
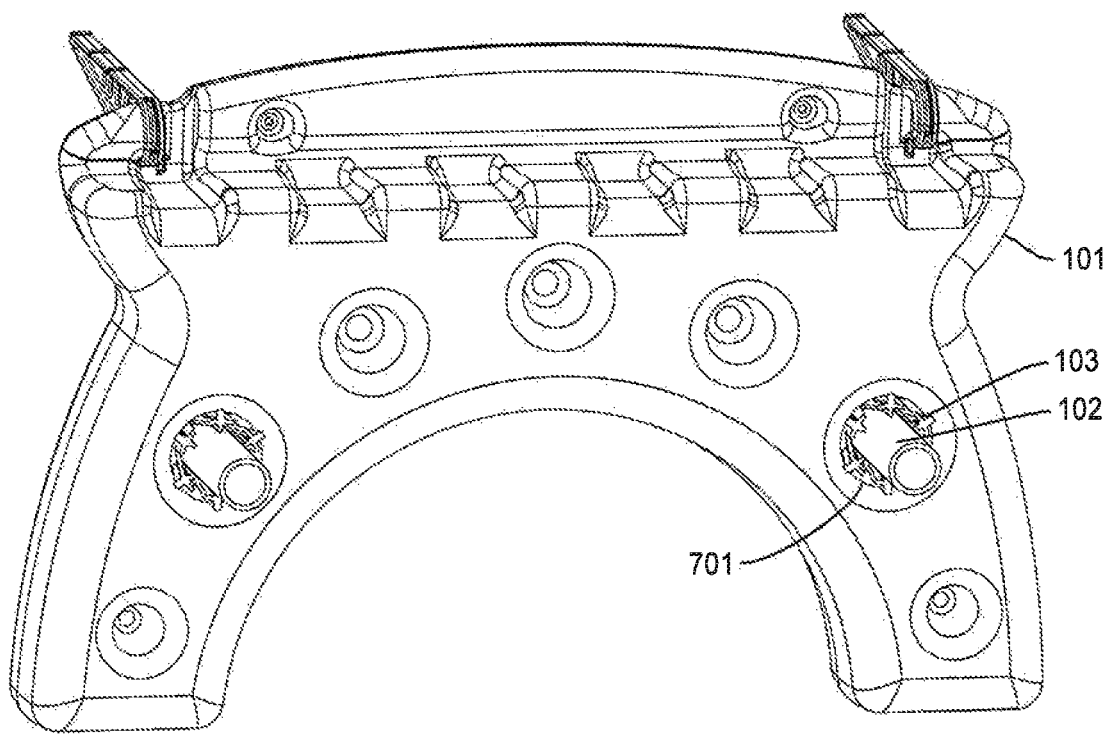
FIG. 9 illustrates a system for mounting a tubular structure using a bushing assembly in accordance with aspects of the present disclosure.

Referring to FIG. 9 which is a cut-away focusing on the system showing in FIG. 8, the mounting structure 101 defines a recess 701. The size and shape of the recess 701 is configured to mate with bushing 103. The size and shape of the bushing 103 is configured to mate with the tubular structure 102. In FIG. 9, bushing 103 is in the compressed state holding tubular structure 102 tightly in place.

Figure 10:
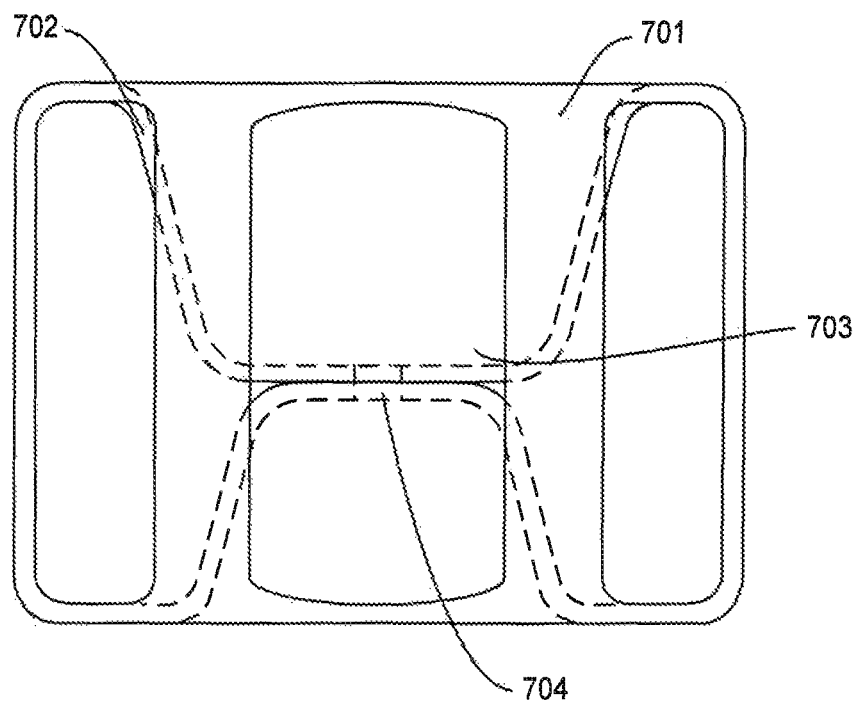
FIG. 10 is a cross-sectional view of the mounting structure.

FIG. 10 is a cut-away focusing on the recess 701. Recess 701 includes walls 702 and inner surface 703 positioned at the base of the recess 701. The walls 702 are conical in shape and slant inward from the outer edge of recess 701 toward the inner surface 703. The size and shape of the recess 701 is configured to mate with bushing 103. In particular, a diameter at the top of the recess 701 must be large enough to receive at least a portion of the projections 131 to begin proper compression and small enough to provide compression on bushing 103. In certain embodiment, the projections comprise outer ridges 133, the diameter at the top of the recess 701 must be large enough to receive at least a portion of the outer ridges 133. A hole 704 is defined approximately at the center of inner surface 703. The hole 704 is utilized to affix the tubular structure 102.

Figure 11:
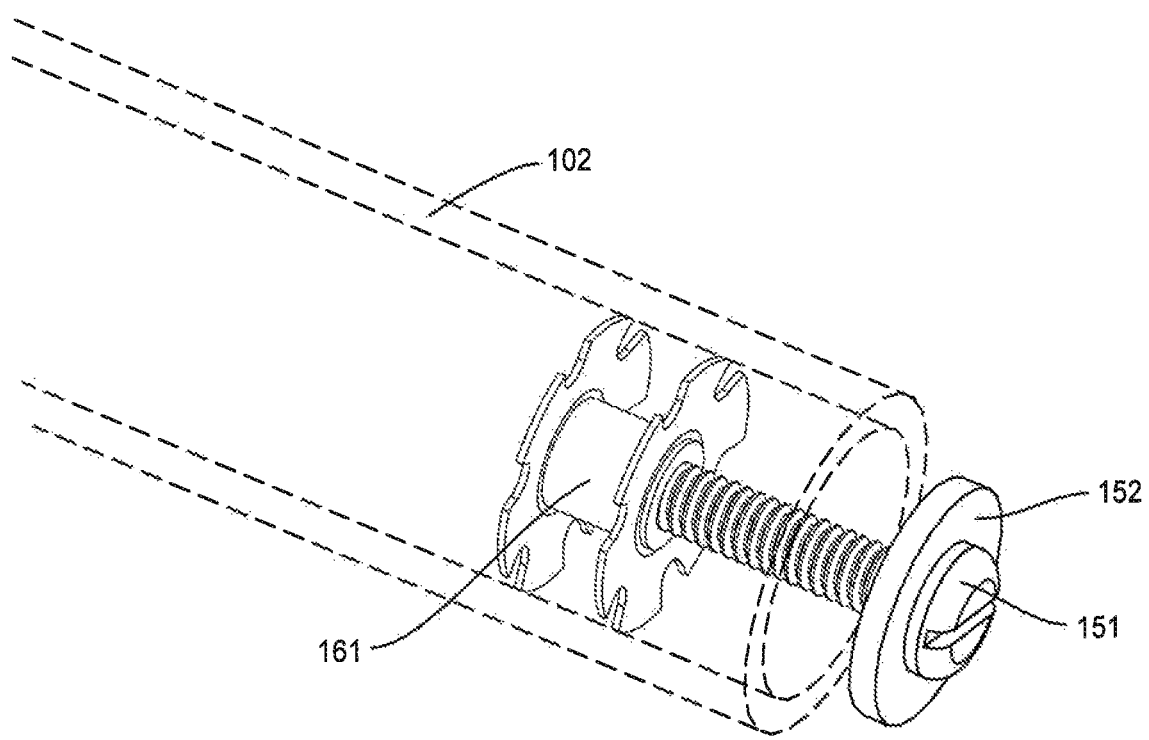
FIG. 11 provides an example of affixing the tubular structure to the mounting structure.

The tubular structures 102 are standard elements that can be hollow or solid. The tubular structures need means to affix a screw or bolt on the end to which it is mounted to the mounting structure. One example of affixing the tubular structure 102 to the mounting structure 102 is shown in FIG. 11. In this embodiment, a connector 161 is affixed within the hollow inside of the tubular structure 102. The connector includes a threaded component to accept a threaded screw 151. An optional washer 152 is also shown. Another example of a tubular structure is a wooden dowel (not shown). With a wooden dowel, a wood screw can be used and no connector would be required. A further example of affixing an entirely hollow tubular structure 102 is by inserting a threaded rod through the back side of the mounting structure 101, through hole 704, through hole 135 in the bushing and into the tubular structure 102, through hole 135 in the other bushing, through hole 704 of the other side of the mounting structure 101, and then tightening two nuts (or with the optional washer) at both ends of the threaded rod.

The bushing 103 has an uncompressed state and a compressed state. In the uncompressed state, the distal ends of the projections 131 are at a first distance from each other and in the compressed state, the distal ends of the projections 131 are at a second distance from each other, the first distance being greater than the second distance. The bushing 103 is moved from the uncompressed state to the compressed state as it is being assembled within recess 701. In addition, in the compressed state, bushing 103 compresses onto the tubular structure 102 to hold it in securely in place.

In order for bushing 103 to transfer from the uncompressed state to the compressed state, bushing 103 and recess 701 must be properly sized to each other. The circumference of the outer edge of the outer body surface is sized to fit within recess 701 without interference from walls 702. The circumference includes the outer ridges 133 if so equipped. The circumference of outer body surface of the bushing 103 increases moving from body 134 to distal ends of projections 131. As bushing is further inserted into recess 701, an inward pressure is exerted onto the outside of projections 131 (or onto the outer ridges 133 if so equipped) forcing projections 131 inward and onto the tubular structure 102 when positioned therein. By adjusting the size of the recess 701 and/or the angle of the walls 702, a tighter or looser fit can be obtained between the bushing 103 and the tubular structure 102.

When bushing 103 is in the uncompressed state, the tubular structure 102 is sized to fit within the inner body surface 136 of the body 134. The tubular structure 102 ideally can be positioned within bushing 103 against the inner body surface 136 of the body 134. In the compressed state of the bushing 103, tubular structure 102 is sized to fit tightly within the inside space formed by the projections 131 (or the inner ridges 132 if so equipped).

At the unattached distal ends of the projections 131, in an uncompressed state, a distance (for example, a diameter of a circularly shaped distal ends of the projections 131) formed by the inner surfaces of the projections 131 (or inner ridges 132 if so equipped) is in the range of from 1" to 2", preferably from 1.25" to 1.5", and more preferably from 1.3" to 1.4", and a distance formed by the outer surfaces of the projections 131 (or outer ridges 133 if so equipped) is in the range of from 2" to 3", preferably from 2.3" to 2.6", and more preferably from 2.4" to 2.5". In a compressed state of the bushing 103, at the unattached distal ends of the projections 131, a distance formed by the inner surfaces of the projections 131 (or inner ridges 132 if so equipped) is in the range of from 1" to 2", preferably from 1.1" to 1.5", and more preferably from 1.2" to 1.25", and a distance formed by the outer surfaces of the projections 131 (or outer ridges 133 if so equipped) is in the range of from 2" to 3", preferably from 2.1" to 2.5", and more preferably from 2.2" to 2.25".

FIGS. 12A, 12B, 12C and 12D provide specific dimensions of one embodiment of a bushing assembly in accordance with aspects of the present disclosure. The inner body surface 136 of the bushing has a diameter of 1.35". The outer body surface 137 of the bushing has a diameter of 1.436". At a point up from the body 134 along the outer ridges 133, a diameter of the outer ridges 133 is 1.645". At the distal ends of the projections 131, a diameter formed by the outer ridges 133 is 2.42". Each projection 131 extends outward from the outer edge at an angle of 12 degrees to longitudinal axis "b". The distance between the outer body surface 137 and the distal ends of the projections 131 is 1.475". The tubular structure 102 has an outside diameter of 1.25" which is slightly less that the diameter of the inner body surface 136 of 1.35". The diameter at the top of the recess 701 is greater than 1.645" (diameter formed about the distal ends of the outer ridges 133) and less than 2.42" (diameter formed at distal ends of the outer ridges 133).

Figure 13B:
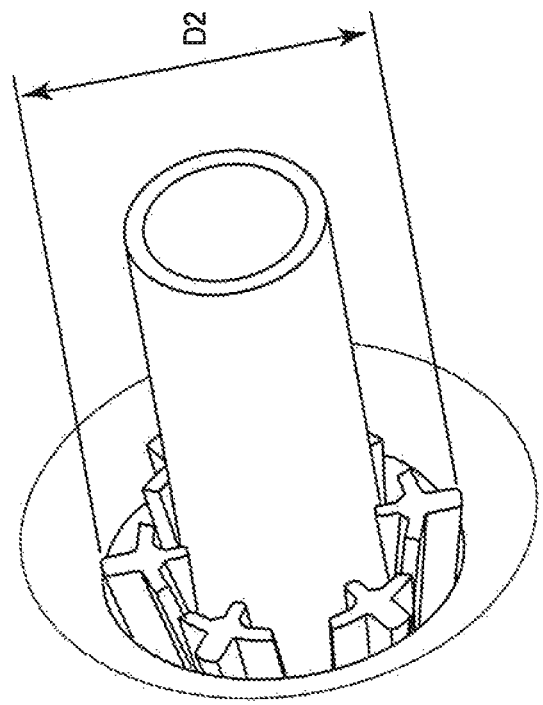
FIG. 13B illustrates the end stage of the assembling process in accordance with aspects of the present disclosure.
Figure 13A:
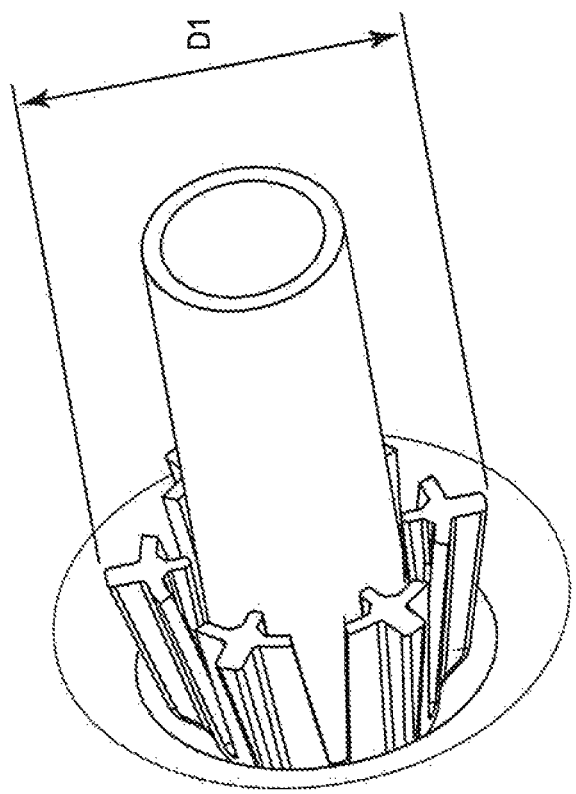
FIG. 13A illustrates the beginning stage of the assembling process in accordance with aspects of the present disclosure.

FIGS. 13A and 13B illustrate the beginning stage and the end stage of the assembling process in accordance with aspects of the present disclosure. In operation, the system for mounting a tubular structure 102 to a mounting structure 101 forms a tight and secure connection between the tubular structure 102 and the mounting structure 101 via the bushing 103. Before inserting the screw, the tubular structure 102 is inserted into the bushing 103. This assembly is then inserted into the recess 701. When the bushing 103 is positioned within the recess 701, the hole 135 in the body 134 of the bushing 103 aligns with the hole 704 in the mounting structure 101. Screw 151 is then inserted from the back side of the mounting structure 101, through hole 704, through hole 135 and into tubular structure 102 (or connector 161 if so equipped). The head of the screw 151 (or with the optional washer) is larger than hole 704 to prevent screw 151 from pulling therethrough when tightened. FIG. 13A illustrates the beginning stage of the assembling process. The projections 131 are all at uncompressed state at a First Distance D1 from each other. As screw 151 is tightened, tubular structure 102 exerts a force onto body 134 forcing bushing 103 into recess 701. As the tightening continues, walls 702 apply an inward force onto projections 131 (or inner ridges 132 and/or outer ridges 133 if so equipped) transitioning bushing 103 from an uncompressed state to a compressed state, which in turn compresses the projections 131 (or inner ridges 132 and/or outer ridges 133 if so equipped) onto tubular structure 102. FIG. 13B illustrates the end stage of the assembling process. The projections 131 are all at substantially compressed state at a Second Distance D2 from each other. The First Distance D1 is greater than the Second Distance D2.

Figure 14C:
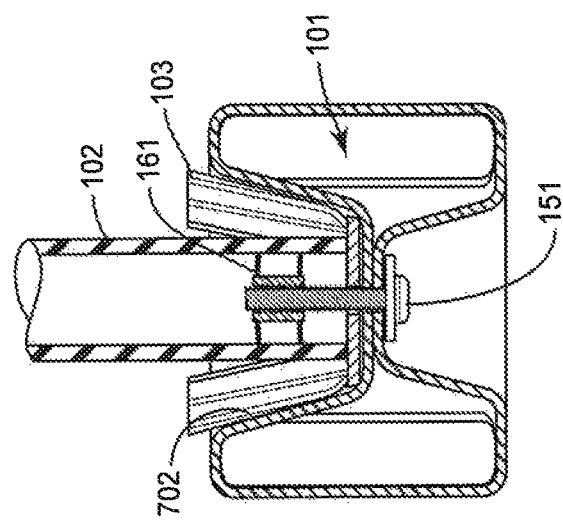
FIG. 14C provides a cross-sectional view of the end stage of the assembling process in accordance with aspects of the present disclosure.
Figure 14B:
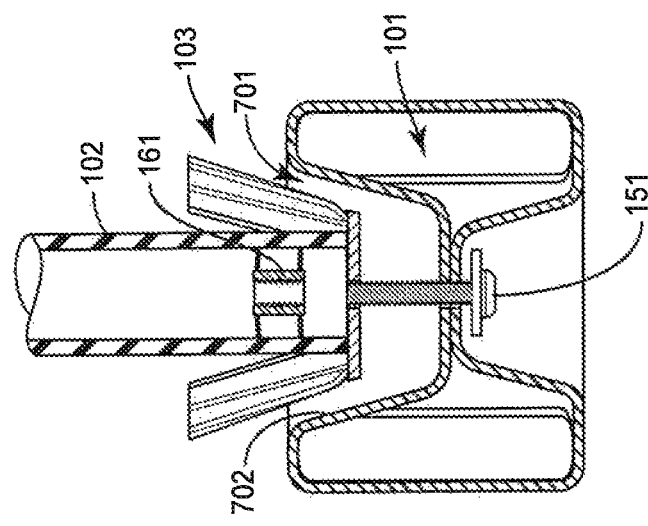
FIG. 14B provides a cross-sectional view of the middle stage of the assembling process in accordance with aspects of the present disclosure.
Figure 14A:
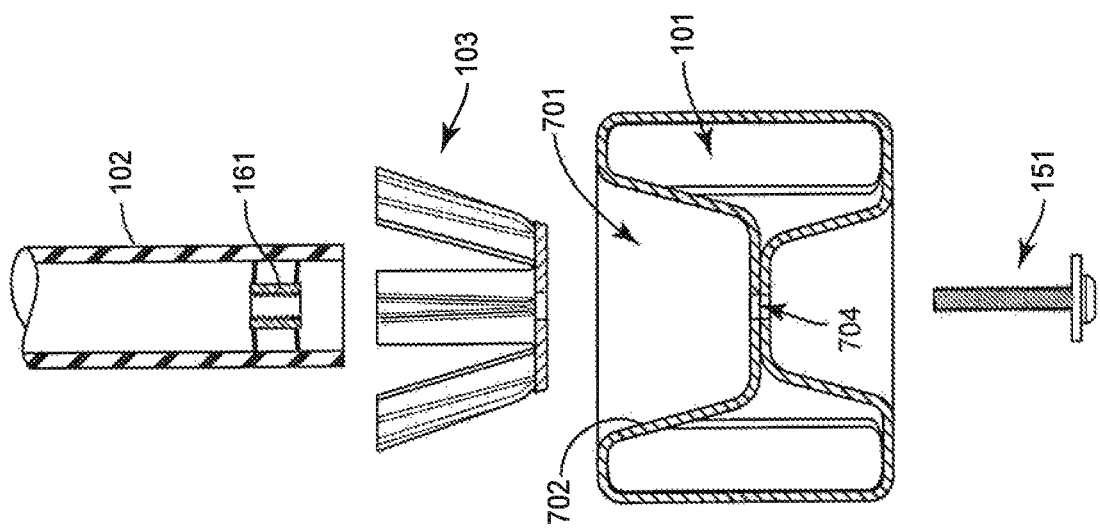
FIG. 14A provides a cross-sectional view of the beginning stage of the assembling process in accordance with aspects of the present disclosure.

FIGS. 14A, 14B and 14C provide cross-sectional views of the beginning, middle and end stages of the assembling process in accordance with aspects of the present disclosure. In particular, FIG. 14A provides a cross-sectional view of the beginning stage of the assembling process. In FIG. 14A, the tubular structure 102, the bushing 103, the mounting structure 101 and the threaded screw 151 are all apart from each other. FIG. 14B provides a cross-sectional view of the middle stage of the assembling process. In FIG. 14B, the tubular structure 102 is inserted into the bushing 103 wherein a threaded component, such as the connector 161 showing in FIG. 11, is aligned with the hole 135 on the bushing 103. The outer body surface 137 of the bushing 103 just entered the recess 701 of the mounting structure 101. No inward force is applied to the projections 131, or the outer ridges 133 if so equipped, by the walls 702 of the mounting structure 101. The threaded screw 151 is inserted into the hole 704 of the mounting structure 101, through the hole 135 of the bushing 103 and just entered the threaded component of the tubular structure 102. The head of the threaded screw 151 (or with the optional washer) is larger than hole 704 of the mounting structure 101 to prevent the threaded screw 151 from pulling therethrough when tightened. As the threaded screw 151 is tightened, tubular structure 102 exerts a force onto body 134 of the bushing 103 forcing bushing 103 into recess 701. As the tightening continues, walls 702 of the mounting structure 101 apply an inward force onto projections 131 (or inner ridges 132 and/or outer ridges 133 if so equipped) transitioning bushing 103 from an uncompressed state to a compressed state, which in turn compresses the projections 131 (or inner ridges 132 and/or outer ridges 133 if so equipped) onto tubular structure 102. FIG. 14C provides a cross-sectional view of the end stage of the assembling process. The tubular structure 102 is fully assembled into the mounting structure 101. The bushing 103 is in the compressed state, holding the tubular structure 102 tightly in place.

Although the system for mounting a tubular structure to a mounting structure has been described herein relating to a tubular structure having a circular cross-sectional profile, the system can be modified to accommodate other shaped tubular structures. By modifying the shape of the bushing to match the shape of the tubular structure and also modifying the recess in the mounting structure accordingly, any shaped tubular structure can be accommodated.

Where this application has listed the steps of a method or procedure in a specific order, it may be possible, or even expedient in certain circumstances, to change the order in which some steps are performed, and it is intended that the particular steps of the method or procedure claim set forth here below not be construed as being order-specific unless such order specificity is expressly stated in the claims.

While the embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims.

What is claimed is:

1. A bushing assembly for tubular structures, comprising:
   a body having an inner body surface, an outer body surface and a body edge;
   wherein the inner body surface defines a substantially planar surface and an outer edge having a circumference, the outer body surface defines another substantially planar surface and another outer edge having another circumference, the two substantially planar surfaces are substantially parallel to each other; and the body edge is attached to the circumference of the outer edge of the inner body surface and the circumference of the outer edge of the outer body surface; and a plurality of projections extending outward from the body edge and traverse to the planar surface defined by the outer body surface, each projection defining a longitudinal axis, wherein each projection has an inner surface, the inner surface comprising surface features selected from the group consisting of a plurality of elevated small areas, a coating of a thin layer of rough materials, a physical treatment to coarse the inner surface, and a chemical treatment to coarse the inner surface.

2. The busing assembly of claim 1, wherein the inner surface has a smooth surface.

3. The bushing assembly of claim 1, wherein each projection has an inner surface, each projection further comprising an inner ridge extending at least partially along the inner surface of the projection and along the longitudinal axis.

4. The bushing assembly of claim 3, wherein the inner ridge has a smooth surface.

5. The bushing assembly of claim 3, wherein the inner ridge further comprises surface features.

6. The bushing assembly of claim 5, wherein the surface features comprise a plurality of elevated small areas, a coating of a thin layer of rough materials, and a physical or chemical treatment to coarse the inner ridge.

7. The bushing assembly of claim 1, wherein each projection has an outer surface.

8. The bushing assembly of claim 7, wherein the outer surface has a smooth surface.

9. The bushing assembly of claim 7, wherein the outer surface further comprising surface features.

10. The bushing assembly of claim 1, wherein each projection has an outer surface, each projection further comprising an outer ridge extending at least partially along the outer surface of the projection and along the longitudinal axis.

11. The bushing assembly of claim 10, wherein the outer ridge has a smooth surface.

12. The bushing assembly of claim 10, wherein the outer ridge further comprises surface features.

13. The bushing assembly of claim 1, wherein each projection has an inner surface and an outer surface, each projection further comprising:
   an inner ridge extending at least partially along the inner surface of the projection and along the longitudinal axis; and
   an outer ridge extending at least partially along the outer surface of the projection and along the longitudinal axis.

14. The bushing assembly of claim 1, wherein the body comprises a hole therethrough positioned substantially in the center of the body.

15. The bushing assembly of claim 1, wherein the body is sized and shaped to receive an end of a similarly sized and shaped tubular structure.

16. The bushing assembly of claim 1, the bushing assembly having an uncompressed state wherein the distal ends of the projections are at a first distance from each other and a compressed state wherein the distal ends of the projections are at a second distance from each other, the first distance being greater than the second distance.

17. The bushing assembly of claim 1, wherein each projection extends outward from the body edge at an angle between 1 degree and 20 degrees.

18. A system for mounting a tubular structure to a mounting structure, comprising:
   a tubular structure;
   a mounting structure;
   a bushing assembly, comprising:
      a body having an inner body surface, an outer body surface, a body edge and a hole;
      wherein the inner body surface defines a substantially planar surface and an outer edge having a circumference, the outer body surface defines another substantially planar surface and another outer edge having another circumference, and the two substantially planar surfaces are substantially parallel to each other, the body edge is attached to the circumference of the outer edge of the inner body surface and the circumference of the outer edge of the outer body surface, and the hole is positioned substantially in the center of the body; and
   a plurality of projections extending outward from the body edge and traverse to the planar surface defined by the outer body surface, each projection having an unattached distal end and defining a longitudinal axis, the unattached distal ends defining a circumference greater than the circumference of the outer edge defined by the outer body surface,
   wherein the body and the projections define an inner cavity of the bushing, and
   wherein the plurality of projections defines an outer surface of the bushing;
   the tubular structure mateable within the inner cavity of the bushing assembly and having a cross-sectional circumference, comprising:
      a connector connectable to the tubular structure,
      wherein the circumference of the inner body surface of the bushing is substantially equal to the circumference of the tubular structure;
   the mounting structure defining a recess mateable with the outer surface of the bushing and having an inner conical shape and an inner surface positioned at a base of the recess, the mounting structure defining a hole therethrough positioned substantially in the center of the inner surface of the recess; and
   a mating connector through the hole of the mounting structure and the hole of the bushing assembly, and mateable with the connector of the tubular structure,
   wherein each projection has an inner surface and an outer surface, and each projection comprises a ridge extending at least partially along at least one of the inner surface or the outer surface of the projection and along the longitudinal axis.

19. The system of claim 18, wherein the bushing assembly has an uncompressed state wherein the plurality of projections is at a first distance from each other and a compressed state wherein the plurality of projections is at a second distance from each other, the first distance being greater than the second distance.

20. The system of claim 18, wherein the connector is a threaded connector affixed within and positioned substantially at an end of the tubular structure and the mating connector is a screw extendable through the hole of the mounting structure and the hole of the bushing assembly.

\* \* \* \* \*